United States Patent Office 2,988,487
Patented June 13, 1961

2,988,487
PROCESS OF TREATING KERATINACEOUS MATERIAL AND A KERATINASE PRODUCED THEREBY
Walter J. Nickerson, Princeton, and Joseph J. Noval, University Heights, N.J., assignors to Rutgers Research and Educational Foundation, New Brunswick, N.J., a non-profit corporation of New Jersey
No Drawing. Filed Aug. 29, 1957, Ser. No. 680,930
8 Claims. (Cl. 195—5)

The present invention relates to a process of treating natural keratinaceous material to produce useful protein degradation products, and particularly to such a process wherein the degradation of the keratinaceous material is effected by the use of *Streptomyces fradiae*, the products obtained being water-soluble and being separable from the remaining keratinaceous material, if any, by reason of this water-solubility. The water-soluble product of the process aforesaid is also effective as a proteolytic enzyme which is capable of digesting native keratin as herein defined. This keratinase is also a novel composition constituting a part of the present invention.

This application is a continuation-in-part of our prior and copending application Serial No. 599,328, filed July 23, 1956, and entitled "Process of Treating Keratinaceous Material and a Keratinase Produced Thereby," which prior application is now abandoned.

Many keratinaceous materials which are available in industry have some, but relatively limited, uses. Among such materials are, for example, animal hair, hoofs of animals which have been slaughtered for meat or other purposes, feathers of chickens or other birds, fish scales, etc. The present invention has as one of its general objects the provision of an economical process which will convert such available keratinaceous materials into products which are useful in industry and which have values much greater than the raw materials from which they are made. For example, in accordance with this invention, keratinaceous material may be broken down, or the molecules thereof degraded, to provide polypeptides and/or amino acids. These materials in turn are industrially useful and valuable materials. For example, certain of the polypeptides which may be prepared in accordance with the present invention are useful in stabilizing the foam which is now widely used in fighting oil fires. Amino acids are useful in the making of cattle feeds by known processes, which per se form no part of the present invention.

It is also contemplated as a further possible use for the present invention that the degradation products of the keratinaceous material, which are essentially similar to many protein degradation products, may be useful in the making of detergents by further processes which are known, but which per se form no part of the present invention. Many other uses of the products of the present invention may also be readily visualized.

Protein materials and particularly keratinaceous materials have been chemically broken down in the past to form smaller molecules. Some of the treatments which have been known for accomplishing this result have, for example, involved chemical treatment under superatmospheric pressure and at relatively high temperatures. Such processes have required, at least as a first stage, the use of autoclaves or the like. All such processes are relatively expensive to carry on by reason of the requirements for high temperatures and/or pressures, as well as by reason (in some instances) of the cost of the chemicals used. The present process, which relies solely upon the action of any one or more of certain types of microorganisms, may be, and in fact is, preferably carried on in the range of temperature between about 20° C. and about 40° C. and without requiring the use of pressure vessels or of pressures other than atmospheric. In this way, the present process is substantially superior from an economical point of view to certain prior art processes.

Keratinaceous materials are quite resistant to a degradation type of attack. This characteristic has been a principal feature distinguishing keratin from other types of protein. It is, however, well known that a small part of all keratinaceous structures as they occur in nature (e.g. feathers, hair, wool, hooves) which are herein defined as "natural" keratin can be digested by proteolytic enzymes such as trypsin, pepsin and papain. In the case of wool, the part digested by the above proteolytic enzymes is generally considerably less than ten percent of the weight of the fiber; with hair, only about one or two percent can be digested by these enzymes. This type of proteolytic digestion, obviously, cannot be considered as keratin digestion.

Turning now more particularly to, and summarizing the present invention, it comprises the process of treating natural keratinaceous materials as aforesaid with a culture of *Streptomyces fradiae*, under conditions such as to facilitate the degradation action, the degradation products being water-soluble. As such, the action of the microorganism is carried on in an aqueous medium in which these products are dissolved by reason of their solubility. It has been found that this aqueous medium, for best results, should preferably have a pH of about 8.5 to about 9.5; although from a broader point of view, the process is fully operable in the pH range of about 7 to about 10. This pH control may be attained by suitable buffering as hereinafter set forth.

The microorganisms which have been found useful in carrying out the process of the present invention are described in the publication "Actinomycetes and Their Antibiotics," by Waksman and Lechevalier, published in 1953 by Williams and Wilkins Company, Baltimore, Md. Thus, *Streptomyces fradiae* is described on page 97 of this book. Cultures of some of these microorganisms have been deposited in the culture collection of the Institute of Microbiology of Rutgers, the State University, New Brunswick, New Jersey, and all the numbers hereinafter recited refer to the numbers of this collection. This is indicated by the initials I.M. before each number (abbreviation for Institute of Microbiology). A strain of *Streptomyces fradiae* which has been found especially useful for carrying out the process hereinafter recited is I.M. No. 3739 which has been isolated from soil and in the description which follows, this culture has been shown to be of the species *Streptomyces fradiae*.

A further part of this invention is the discovery that the water-soluble product of the reaction of the aforementioned Streptomyces species, with keratinaceous material is an enzyme which may be termed a "keratinase," which may be separated from the water-insoluble material in the original growth medium in which it was produced, and then used apart from the microorganism by which it was produced for the purpose of attacking other keratinaceous material. As such, this "keratinase" enzyme is a product of the present invention in that it is made by the process thereof, is a valuable product, and thus per se forms a part of this invention.

In this specification the term "keratinase" is employed since it agrees with the standard terminology of enzyme chemistry—the suffix "ase" is added to the name of the substance attacked by the enzyme. The term "keratinase" is familiar in the literature on enzymology, even though reference to standard texts on this subject (e.g. "Chemistry and Methods of Enzymes," by Sumner et al., 1953, published by Academic Press Inc., N.Y., page 179) fails to show that any known enzyme has the property of attacking native or natural keratin. The finding of Michaelis and Goddard (referred to in Sumner et al.'s book aforesaid, page 179) to the effect that the product (kerateine) resulting from chemical reduction of keratin (by compounds containing sulfhydryl groups, e.g. sodium thioglycolate) is digestible by trypsin, cannot be considered to be a demonstration of enzymatic attack on native, unaltered keratin. The enzymes produced in accordance with the present invention, on the other hand, immediately attack the most pure, unaltered forms of keratin (e.g. native or natural wool and feathers), and liberate soluble polypeptide material from the insoluble keratin. The rapidity of this action is shown herein, and compared therewith is the very slight degree of peptide solubilization effected by so-called proteolytic enzymes known to the prior art, e.g. trypsin or papain. As previously stated, the material liberated from wool by these latter enzymes is known to be derived from the non-keratinous portions of wool.

The keratinase of the present invention may be salted out of the aqueous solution in which it is formed as aforesaid, for example by adding a mineral salt, such as ammonium sulphate, to that water solution or filtrate and may also be separated by evaporation of the water in which it is dissolved, preferably in the cold. It may also be precipitated from the aqueous solution by the addition of alcohol or ethanol to a final concentration of 60 to 70 percent.

The invention will be better appreciated from a detailed description of some of the experimental work upon which it is founded.

It has been found that a characteristic common to all true keratins is their resistance to decomposition by proteolytic enzymes. Wool is the most thoroughly studied keratinaceous material, and it has been reported by numerous prior art investigators that, in general, not more than about ten percent of the dry weight of "undenatured" wool (this expression later to be defined and being equivalent to what is herein called "natural keratin") is converted to a water-soluble form, even by prolonged action of such known proteolytic enzymes as pepsin, trypsin or papain. The present invention, however, involves the discovery that at least one kind of the Streptomyces species hereinbefore referred to has very substantial keratinolytic activity when used directly on natural keratin.

In a preferred embodiment, it has been found that a culture of *Streptomyces fradiae,* I.M. No. 3739 has been shown to be capable of converting about ninety percent of the dry weight of unaltered coarse and medium wool and chicken feathers (each) to some water-soluble form. This percent was determined by loss in weight of a mass of each of the keratinaceous materials tested, as well as by checking the increase of soluble nitrogen in the resulting aqueous medium.

When undenatured wool or other keratin material (feather and coarse wool) prepared as aforesaid, was treated with known enzymes, such as trypsin and papain, only about 10% of the keratin (by weight) was converted to some water-soluble form; while medium wool similarly treated was solubilized only to the extent of about 3½% to 4%. When these same materials, prepared in exactly the same manner, were similarly treated with the water-soluble enzyme of the present invention, as hereinabove very generally set forth, at least twice as much of the weight of the keratinaceous materials tested were respectively converted to water-soluble forms.

The following investigation has shown the strain I.M. No. 3739 to be a strain of *Streptomyces fradiae*:

Aerial mycelia were produced on Czapek's agar, Bennett's agar and on nutrient agar in the form of thick, gnarled, abundantly anastomosing hyphae, the ends of which were frequently constricted to form one or two spores, or long chains of spores. The spores were of the same width as the aerial mycelia and were nearly spherical in shape; sporophores were straight; no spirals were observed.

After five days' growth on potato agar, the surface growth became pink in color; no pigment was observed in the medium. Vegetative mycelia were much thinner and less branched than aerial mycelia; hyphae were usually straight; chains of spores were rarely present, and spores were wider than mycelia; no spirals were observed.

In gelatin some liquifaction was found to occur at 28° C. and somewhat greater liquifaction at 35° C.; in litmus milk growth was found to be abundant with slight production of acidity, but with no coagulation.

These properties of *Streptomyces fradiae,* I.M. No. 3739 resemble the characteristics recorded for *Streptomyces fradiae,* and it has been concluded, therefore, that strain I.M. No. 3739 is a strain of *Streptomyces fradiae.*

Other strains of *Streptomyces fradiae* have also been found to be effective as is indicated by the following table:

TABLE I

*Ability of strains of* Streptomyces fradiae *to digest undenatured wool*

| Organism | Percent of Wool Digested in 8 days | Time for 80% Digestion of Wool, days |
|---|---|---|
| Streptomyces fradiae I.M. No. 3739 | 95 | 6 |
| Streptomyces fradiae I.M. No. 3535 | 50 | 10 |
| Streptomyces fradiae I.M. No. 3572 | 20 | 11 |

Because of the community of biochemical characteristics shared by the *Streptomyces fradiae* species, it is believed possible selectively to adapt all the other and various strains of this species to obtain the property of an exocellular keratinolytic enzyme.

As indicated hereinafter, several isolates of *Streptomyces fradiae* have been tested and found to have the ability to digest natural wool. Certain strains of *Streptomyces fradiae* have shown remarkable ability in digesting untreated or natural wool, in that *Streptomyces fradiae,* I.M. No. 3739, has digested 95% of a sample of wool in a thirty-day period of incubation; while *Streptomyces fradiae,* I.M. No. 3719, has digested about 90% of a wool sample in the same period.

It has been found that the use of *Streptomyces fradiae* I.M. No. 3739 is to be preferred, at least in the digestion of wool, because of the relatively rapid manner in which it exhibits its keratinolytic activity. Thus, in achieving the results given above, the wool treated with this strain was 95% digested within eight days; while none of the other strains tested were capable of approaching this rate of digestion.

In preparing the keratinaceous materials for use so as to have what is herein termed "undenatured" or natural wool, samples of wool and chicken feathers were directly obtained from the animal source, extracted with inert solvent to remove fatty materials on the surface thereof, and sterilized by exposure to vapors of ethylene oxide at a partial pressure of about one-half atmosphere. Extensive analyses showed that keratin prepared in this manner had the full content of cystine and contained no demonstratable cysteine or free sulfhydryl groups (—SH).

These materials may be termed "undenatured" or "natural" as contrasted, for example, with animal hair that has been heated in the presence of fifteen pounds (gauge) steam for 15 to 20 minutes in an autoclave, which is thereafter capable of being completely digested to form water-soluble protein degradation products by several of the known proteolytic enzymes, e.g. trypsin and papain. Thus from the point of view of the breaking down of keratin, steam is to be considered as a powerful reducing agent.

Each of these keratinaceous materials was prepared for testing by first thoroughly extracting the respective materials with ether or chloroform at room temperature, then washing each material repeatedly with distilled water. The materials thus prepared were tested for soluble nitrogen after suspending them for several hours in an aqueous solution, which was controlled by an 0.01 molar phosphate buffer, to a pH of 8.5. The constituents of this buffer were $KH_2PO_4$ and $K_2HPO_4$. In these tests, no soluble nitrogen was found. The keratinaceous materials were then sterilized by exposure to ethylene oxide at a partial pressure of one-half atmosphere for twenty-four hours.

In making up an aqueous medium, including a given keratin for treatment with the microorganism, 200 mg. of the keratin were added to 100 ml. of a sterile solution of the buffer salts as aforesaid for establishing a pH in the aqueous medium of about 8.5 (except for tests wherein the pH was intentionally varied to determine the effect of such variation). The results above referred to, i.e. 95 percent conversion to a water-soluble state, were obtained after six days of shaken culture at about 28° C. with the Streptomyces fradiae I.M. No. 3739.

A product of the present invention is a keratinase or particular kind of enzyme and is produced as aforesaid by the reaction of various strains of Streptomyces fradiae as aforesaid with keratinaceous materials, this reaction serving to convert a substantial part of the keratinaceous material to some water-soluble form. The soluble material may be then separated from any remaining undissolved keratin and from any other solids, including all the microorganisms originally present, so as to provide a solution or filtrate (produced by filtration or separated by any other known means, including decantation). It has been found that the water-soluble keratinase may be separated from the solution or filtrate aforesaid as a solid material, for example, by salting out this keratinase by adding some inorganic salt to the liquid, such as ammonium sulphate, or by the addition of ethanol or acetone to a concentration sufficiently high so as to cause precipitation of the enzyme.

The filtrate containing the active ingredient (keratinase) may also be dialyzed with distilled water to remove any low molecular-weight water-soluble materials which will pass through the porous membrane and leave the desired enzyme which is non-dialyzable. Fractionation may be effected, tending to concentrate the protein-like enzyme by repeatedly salting it out of an aqueous solution. This type of purification has been practiced to produce a fourteen-fold concentration-purification of the active ingredient.

It is recognized that the material purified as far as has been done to the present time may still contain more or less inactive material as well as the active fraction or keratinase. However, this is immaterial from the point of view of many of the uses to which this material may be put, such, for example, as the making of polypeptides, usable in stabilizing firefighting foam and/or the making of amino acids, usable in the production of animal feeds.

Filtrates, including the keratinase of the present invention, have been found to retain their keratinolytic activity for weeks, when stored at about 4° C. with the pH of the filtrate adjusted to approximately 7.0 and with a small amount of toluene added to prevent bacterial contamination. If, however, such filtrates are stored in an aqueous solution having a pH of about 8.5, which is an original preferred pH of the filtrate as aforesaid, the keratinolytic activity is rapidly lost.

The keratinolytic activity of the product, when used in the form of a culture filtrate, is reduced partially or wholly eliminated by the absence of trace amounts of one or more metals, such as iron, calcium, magnesium and zinc. Of these metals, the presence of trace amounts of magnesium seems to be most essential. It has also been found that phophorous must be present, usually in the form of a soluble phosphate; and sulphur must be present usually in a soluble sulphate, in order that the keratinolytic activity may be maintained. However, inasmuch as it is common to use a phosphate buffer, and as the requirements, not only for the presence of metals, but also for the phosphate and/or sulphate, are satisfied by the presence of trace amounts of these several materials, such trace amounts may and often are supplied by the use of ordinary tap water. In many instances, such necessary materials also may be present in many natural sources of keratin, so that this requirement usually does not call for any special treatment. Hence, the addition of such materials is not ordinarily considered a positive process step or requirement in the present process.

The requirement for certain metals was discovered in connection with tests of the keratinolytic activity of the culture filtrate when certain chelating agents were added. It was found, for example, that a concentration of $1 \times 10^{-3}$ molar EDTA (ethylene-diamine-tetra-acetic acid) will inhibit 55 percent of the keratinolytic activity of the culture filtrate; and a concentration of $1 \times 10^{-2}$ molar of this material will cause a complete inhibition of this activity. Other known chelators, such as sodium citrate, also have very substantial inhibiting actions. It is noted, however, that chelators of this kind are not normally present and would not be present under any normal operating conditions or unless they were positively added for experimental purposes as was done during the tests which were run to determine the facts hereinabove set out.

Further, tests have shown that the keratinase of the present invention is apparently a protein, as it has a nitrogen content substantially the same as that of known proteins, i.e. about 16½ percent. Furthermore, it is non-dialyzable, and it is inactivated by heating to about 100° C. for five minutes, and it can be precipitated with any one of the materials: ethyl alcohol, acetone and ammonium sulphate, all as aforesaid.

The keratinase of the present invention has strong general proteolytic activity in that it will rapidly digest casein and gelatin.

The enzyme or keratinase produced according to the present invention as aforesaid is much more active than other known enzymes in attacking keratin as previously set out. This increase of keratinolytic activity is further demonstrated by a test conducted by first treating undenatured wool with an excessive amount of trypsin, which, as aforesaid, will solubilize less than 10 percent thereof. After about twelve hours of this digestion, the undissolved portion of the keratin remaining was carefully washed, then divided into several portions, one of which was exposed to a fresh trypsin treatment. It was found that no more keratin was dissolved in this fresh trypsin, even after a substantial period (twenty-four hours or more) of further incubation. Another portion of the undissolved remainder from the first trypsin treatment was digested with the keratinase of the present invention and was found to be further solubilized to almost the same total extent as a fresh sample of the original starting keratinaceous material digested in an aqueous medium with the same keratinase of the present invention (without trypsin treatment), i.e. around 18 percent of the original starting weight of the keratinaceous material. These facts prove conclusively that the keratinase of the present invention is a distinctly different enzyme than trypsin or papain and that its action on keratin is distinctly different from and superior to that of trypsin or papain.

The keratinolytic activity of the Streptomyces organism and of the enzyme produced thereby as aforesaid seems to be affected to a substantial extent by the pH of the aqueous medium in which the digestion takes place. This effect has been tested to show the maximum amount of protein which may be solubilized in an indefinite period with all the conditions, except the pH, remaining or being held constant. With solutions buffered to different pH values, it has been found that substantial activity occurs throughout the alkaline range of pH, specifically from about 7 to about 10, but with the maximum effect at pH about 8.5 to about 9.5. In this narrower range, the amount of keratin solubilized was approximately three times the maximum amount which may be solubilized at about the limits of the broader range given.

For a more complete understanding of this invention, reference will now be made to certain specific examples which indicate certain applications of this invention. However, it will be apparent that in its broader aspects this invention is not limited to the specific examples herein presented.

EXAMPLE I

This example illustrates a preferred set of conditions for the breaking down to keratin for forming polypeptides. In this test, native, undenatured wool, as previously described, was used as the growth-supporting proteinaceous substratum, being the sole source of carbon and nitrogen. In one particular test, 170 mgs. of Dorset ewe undenatured wool were placed in a container with 100 ml. of sterilized basal salt solution. This is a standard solution of the following composition:

1.5 g. $K_2HPO_4$
.025 g. $MgSO_4 \cdot 7H_2O$
.025 g. $CaCl_2 \cdot 2H_2O$
.015 g. $FeSO_4 \cdot 7H_2O$
.005 g. $ZnSO_4 \cdot 7H_2O$
Enough water to make 1 liter.

This sterilized salt solution contained a small amount of phosphate buffer, prepared as aforesaid, as well as trace amounts of soluble salts of calcium, magnesium, zinc and iron, the final pH of the solution being 8.4 as stabilized by the buffer present. The wool, previously sterilized by treatment with ethylene oxide, was added aseptically to the sterile solution. The culture medium so prepared was then inoculated with a dilute spore suspension of *Streptomyces fradiae* I.M. No. 3739 and incubated at 28° C. for seven days, while being continuously shaken. At the end of this period, it was found that there remained only 9 mg. of undigested wool, i.e. the wool initially present had been 94.7 percent digested.

The same procedure was used using *Streptomyces fradiae* I.M. No. 3739, I.M. No. 3535 and I.M. No. 3572 with digestion periods of eight days and longer with the results as particularly set out in Table I above.

EXAMPLE II

Following the procedure of Example I, *Streptomyces fradiae* I.M. No. 3739 was inoculated into sterile culture media, each containing the standard basal salt of the same formulation given in Example I and with 100 mg. of different keratinaceous materials as follows:

(1) Coarse commercial wool
(2) Dorset ewe wool (as in Example I)
(3) Chicken feathers
(4) Coarse wool The cultures were incubated for seven days at 28° C., at the end of which time the amount of keratin digested was determined. For the culture containing coarse commercial wool, 95.3 percent had been digested, that with Dorset ewe wool showed 94.7 percent digested, 94.5 percent with chicken feathers, and 93.0 percent with coarse wool.

EXAMPLE III

The procedure of Example II was followed using the same microorganism, except that the source of keratin was hoof meal made from cattle hoofs, with different amounts being added to the medium. With 2 percent hoof meal, 90 percent was solubilized within four days; with 10 percent hoof meal, there was 80 percent digested in four days; and 80 percent digestion of 20 percent hoof meal, also within four days.

EXAMPLE IV

Different strains of *Streptomyces fradiae* were inoculated into the sterile culture of the composition used in Examples I—III. One hundred mgs. of coarse commercial wool sterilized with ethylene oxide was added in each test. The cultures were incubated at 28° C. and after thirty days the amount of wool digested was determined, with the results shown above.

EXAMPLE V

The dry enzyme, which is a novel product according to this invention, was prepared as follows:

*Streptomyces fradiae* I.M. No. 3739 was inoculated into five liters of a sterile basal salt solution of the composition set out in Example I, the solution also containing 5 percent hoof meal. This culture was subjected to continuous aeration and agitation for 48 hours at about 35° C. At the end of this time, essentially all of the hoof meal had been digested. The culture was filtered and the cell-free culture broth (the filtrate) was treated with ammonium sulfate to precipitate keratinase. After removal of the salt by dialysis, the liquid containing the keratinase was lyophilized to a dry powder.

This powder was assayed for keratinase activity by the following procedure:

In each of a group of test tubes there was placed 200 mg. of scoured chopped wool in 0.025 M borate buffer (a sodium borate-boric acid combination provided to adjust the pH to 8.6), keratinase in the amount specified in Table III below, with $10^{-3}$ M $MgCl_2$ in a total volume of 10 ml. After three hours' incubation at 36° C., the contents of the test tubes were filtered, and the increase in optical density of the filtrate at a wavelength of 280 millimicrons (2800 A.) measured in a Beckman spectrophotometer to obtain a measure of the amount of wool solubilized. The results are set out in Table II which follows:

TABLE II

In this table, the increase in optical density (a standard term expressed as a ratio) is compared with enzyme concentration expressed in micrograms/ml. (μg./ml.). The data obtained were as follows:

| Enzyme concentration in μg./ml.: | Increase in optical density |
| --- | --- |
| 1 | .007 |
| 3 | .030 |
| 5 | .040 |
| 10 | .083 |
| 20 | .130 |
| 50 | .197 |

The optical density at 280 millimicrons (2800 A.) is a standard assay procedure described in the literature by O. Warburg and W. Christian, 1941 "Biochem. Zeit.," vol. 310, page 384. The optical density is a direct measure of tyrosine or other aromatic amino acid-containing peptides in the liquid medium.

In contradistinction to the activity of the keratinase of the present invention it was found that at 25 μg./ml. under identical conditions, papain showed an increase in optical density of zero while trypsin showed an increase in optical density of .045 at 20 μg./ml. and .051 at 40 μg./ml.

While there is herein described but a few embodiments of the present invention, both from a process and product point of view, it is intended that all such inventive subject matter reasonably equivalent to the present particular disclosure shall be embraced within the scope of the appended claims, which are to be construed validly as broadly as the state of the prior art permits.

What is claimed is:

1. The process of treating keratinaceous material to produce useful protein degradation products, said process comprising the steps of growing a culture of *Streptomyces fradiae* in an aqueous medium containing keratinaceous material in the presence of at least trace amounts of chelatable metal ions, while maintaining the pH of said medium in the range of about 7 to about 10, and maintaining the temperature of said medium in the range of about 20° to about 40° C., and recovering water-soluble protein degradation products of the aforesaid process.

2. The process in accordance with claim 1 in which the microorganism employed for contacting said keratinaceous material is *Streptomyces fradiae*, I.M. No. 3739.

3. The process in accordance with claim 1 of treating natural keratinaceous material, in which the pH is maintained in the range of about 8.5 to about 9.5 during the digestion of the keratinaceous material with the *Streptomyces fradiae*.

4. A proteolytic enzyme effective to digest a substantial amount of keratinaceous material including the trypsin-digestible protein of said material and a substantial amount of the keratin protein of said material that is indigestible by trypsin, said proteolytic enzyme being characterized (a) by being water soluble; (b) by being non-dialyzable; (c) by having its keratin-digestive-ability destroyed by heating to about 100° C. for five minutes; (d) by having its maximum keratin-digestive-ability at a pH in the range of about 8.5 to 9.5; (e) by being precipitable from an aqueous solution thereof by the addition of ammonium sulphate; and (f) by having its keratin-digestive-ability dependent on the presence of at least trace amounts of chelatable metal ions.

5. An enzymatic composition comprising a proteolytic enzyme effective to digest a substantial amount of keratinaceous material including the trypsin-digestible protein of said material and a substantial amount of the keratin protein of said material that is indigestible by trypsin, said proteolytic enzyme being characterized (a) by being water soluble; (b) by being non-dialyzable; (c) by having its keratin-digestive-ability destroyed by heating to about 100° C. for five minutes; (d) by having its maximum keratin-digestive-ability at a pH in the range of about 8.5 to 9.5; (e) by being precipitable from an aqueous solution thereof by the addition of ammonium sulphate; and (f) by having its keratin-digestive-ability dependent on the presence of at least trace amounts of chelatable metal ions said enzymatic composition having an activity that will produce an increase in the optical density of at least 0.04 at 2800 A. of the filtrate from the incubation, for three hours at 36° C., of 50 micrograms of said enzyme composition in 10 milliliters of 0.025 molar aqueous borate buffer containing 200 milligrams of scoured chopped wool and 0.001 molar magnesium chloride, said aqueous buffer containing sodium borate and boric acid in a ratio to provide a pH of 8.6.

6. A stable enzyme composition comprising (A) a proteolytic enzyme effective to digest a substantial amount of keratinaceous material including the trypsin-digestible protein of said material and a substantial amount of the keratin protein of said material that is indigestible by trypsin, said proteolytic enzyme being characterized (a) by being water soluble; (b) by being non-dialyzable; (c) by having its keratin-digestive-ability destroyed by heating to about 100° C. for five minutes; (d) by having its maximum keratin-digestive-ability at a pH in the range of about 8.5 to 9.5; (e) by being precipitable from an aqueous solution thereof by the addition of ammonium sulphate; and (f) by having its keratin-digestive-ability dependent on the presence of at least trace amounts of chelatable metal ions; and also comprising (B) a pH adjusting compound adjusting the pH of the composition to approximately 7.0, to preserve the activity of the enzyme composition when stored at about 4° C.

7. The process of producing a proteolytic enzyme characterized by its ability to digest a substantial amount of keratinaceous material including the trypsin-digestible protein of said material and a substantial amount of the keratin protein of said material that is indigestible by trypsin, which comprises growing *Streptomyces fradiae* in an alkaline aqueous medium in the presence of keratinaceous material, and recovering said proteolytic enzyme from said medium, said proteolytic enzyme being one which is effective to digest a substantial amount of keratinaceous material including the trypsin-digestible protein of said material and also a substantial amount of the keratin protein of said material which is indigestible by said trypsin; and said proteolytic enzyme being further characterized (a) by being water soluble; (b) by being non-dialyzable; (c) by having its keratin-digestive-ability destroyed by heating to about 100° C. for five minutes; (d) by having its maximum keratin-digestive-ability at a pH in the range of about 8.5 to 9.5; (e) by being precipitable from an aqueous solution thereof by the addition of ammonium sulphate; and (f) by having its keratin-digestive-ability dependent on the presence of at least trace amounts of chelatable metal ions.

8. The process in accordance with claim 7 in which the strain of *Streptomyces fradiae* employed in the process is I.M. No. 3739, and in which this strain of microorganism is grown in an alkaline aqueous medium having a pH in the range of about 8.5 to about 9.5, and at a temperature in the range of about 20° C. to about 40° C.

References Cited in the file of this patent

UNITED STATES PATENTS

| | | |
|---|---|---|
| 2,158,499 | Grassman et al. | May 16, 1939 |
| 2,278,233 | Ayres et al. | Mar. 31, 1942 |
| 2,521,582 | Keil et al. | Sept. 5, 1950 |

OTHER REFERENCES

The Actinomycetes, by Waksman, Chronica Botanica Company, Waltham, Mass. (1950), pp. 100 to 103 relied on.

Chemistry and Methods of Enzymes, by Sumner et al., Academic Press Inc., New York (1953), page 179.

Bacteriological Proc., page 125, May 9, 1956.